(12) United States Patent
Vegesna et al.

(10) Patent No.: US 12,079,057 B2
(45) Date of Patent: *Sep. 3, 2024

(54) POWER-CONSERVING OFF-LOADED LOCATION SERVICE

(71) Applicant: MICROSOFT TECHNOLOGY LICENSING, LLC, Redmond, WA (US)

(72) Inventors: Priyanka Bhargavi Vegesna, Redmond, WA (US); Christopher James Kenneth Gunn, Bellevue, WA (US); Armando Moran, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,181

(22) Filed: Aug. 8, 2022

(65) Prior Publication Data
US 2023/0033044 A1    Feb. 2, 2023

Related U.S. Application Data

(63) Continuation of application No. 16/694,619, filed on Nov. 25, 2019, now Pat. No. 11,435,805.

(51) Int. Cl.
*G06F 1/3231*    (2019.01)
*H04L 43/0864*   (2022.01)
(Continued)

(52) U.S. Cl.
CPC ........ *G06F 1/3231* (2013.01); *H04L 43/0864* (2013.01); *H04L 47/283* (2013.01);
(Continued)

(58) Field of Classification Search
None
See application file for complete search history.

(56) References Cited

U.S. PATENT DOCUMENTS

| 2016/0219401 A1* | 7/2016 | Segev ................... H04W 4/021 |
| 2016/0242056 A1* | 8/2016 | Patil ........................ H04W 4/80 |
| 2021/0051561 A1* | 2/2021 | Gupta ................. H04L 43/0864 |

OTHER PUBLICATIONS

U.S. Appl. No. 16/694,619, filed Nov. 25, 2019.
(Continued)

*Primary Examiner* — Christine T Duong
(74) *Attorney, Agent, or Firm* — Newport IP, LLC; Jacob P. Rohwer

(57) ABSTRACT

A communication device assists location services by receiving a virtual boundary condition from the operating system. The virtual boundary condition is received by a wireless communication chipset (e.g., a Wi-Fi chipset) of the communication device. The Wi-Fi chipset measures one or more distances between the communication device and one or more wireless communication devices (e.g., Wi-Fi access points) using a wireless communication distance measuring protocol (e.g., Wi-Fi Fine timing measurement or FTM), determines that the virtual boundary condition has been satisfied by the one or more measured distances, and notifies the operating system that the virtual boundary condition has been satisfied by the one or more measured distances.

20 Claims, 9 Drawing Sheets

(51) Int. Cl.
  *H04L 47/283* (2022.01)
  *H04W 4/02* (2018.01)
  *H04W 4/021* (2018.01)
  *H04W 4/029* (2018.01)
  *H04W 36/32* (2009.01)
  *H04W 48/04* (2009.01)
  *H04W 48/14* (2009.01)
  *H04W 56/00* (2009.01)

(52) U.S. Cl.
  CPC ........... *H04W 4/021* (2013.01); *H04W 4/023* (2013.01); *H04W 4/029* (2018.02); *H04W 36/32* (2013.01); *H04W 48/04* (2013.01); *H04W 48/14* (2013.01); *H04W 56/0075* (2013.01)

(56) References Cited

OTHER PUBLICATIONS

"Notice of Allowance Issued in European Patent Application No. 20811184.9", Mailed Date: Jul. 26, 2023, 8 Pages.
Decision to Grant received for European Application No. 20811184.9, mailed on May 3, 2024, 2 Pages.

* cited by examiner

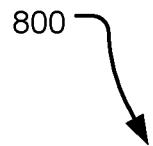

800

Receive a virtual boundary condition in a Wi-Fi chipset of a communication device
802

Measuring one or more distances between the communication device and one or more Wi-Fi access points
804

Determine that the virtual boundary condition has been satisfied by the one or more measured distances
806

Notify the operating system that the virtual boundary condition has been satisfied by the one or more measured distances
808

FIG. 8

POWER-CONSERVING OFF-LOADED LOCATION SERVICE

CROSS-REFERENCE TO RELATED APPLICATION

This application is a continuation of U.S. patent application Ser. No. 16/694,619, filed Nov. 25, 2019, the content of which application is hereby expressly incorporated by reference in its entirety.

BACKGROUND

Location services, such as geofencing and asset tracking, are challenges when attempted indoors. While global navigation satellite system (GNSS) technology, such as global positioning system (GPS) technology, can sometimes connect with communication devices inside a building, the communication signals from GNSS satellites are attenuated and scattered by the building infrastructure, such as roofs, walls, and other objects. As such, the resulting indoor location is typically not accurate or reliable enough to be useful. Furthermore, many GNSS chipsets themselves are not accurate enough to be particularly useful on an indoor scale (e.g., down to locations among individual small rooms or within a single room). In addition, many location services can include continuous power-hungry operations by the primary processors and the operating system of a communication device, such as a mobile phone, a wearable computing device, or an Internet-of-Things (IoT) device. Such operations can consume an unacceptable amount of processing power and electrical charge.

SUMMARY

The described technology provides a communication device that assists location services by receiving a virtual boundary condition from the operating system. The virtual boundary condition is received by a wireless communication chipset (e.g., a Wi-Fi chipset) of the communication device. The Wi-Fi chipset measures one or more distances between the communication device and one or more wireless communication devices (e.g., Wi-Fi access points) using a wireless communication distance measuring protocol (e.g., Wi-Fi Fine timing measurement or FTM), determines that the virtual boundary condition has been satisfied by the one or more measured distances, and notifies the operating system that the virtual boundary condition has been satisfied by the one or more measured distances.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 8 illustrates example operations of an example Wi-Fi assisted indoor location service.

DETAILED DESCRIPTIONS

Figure 1:
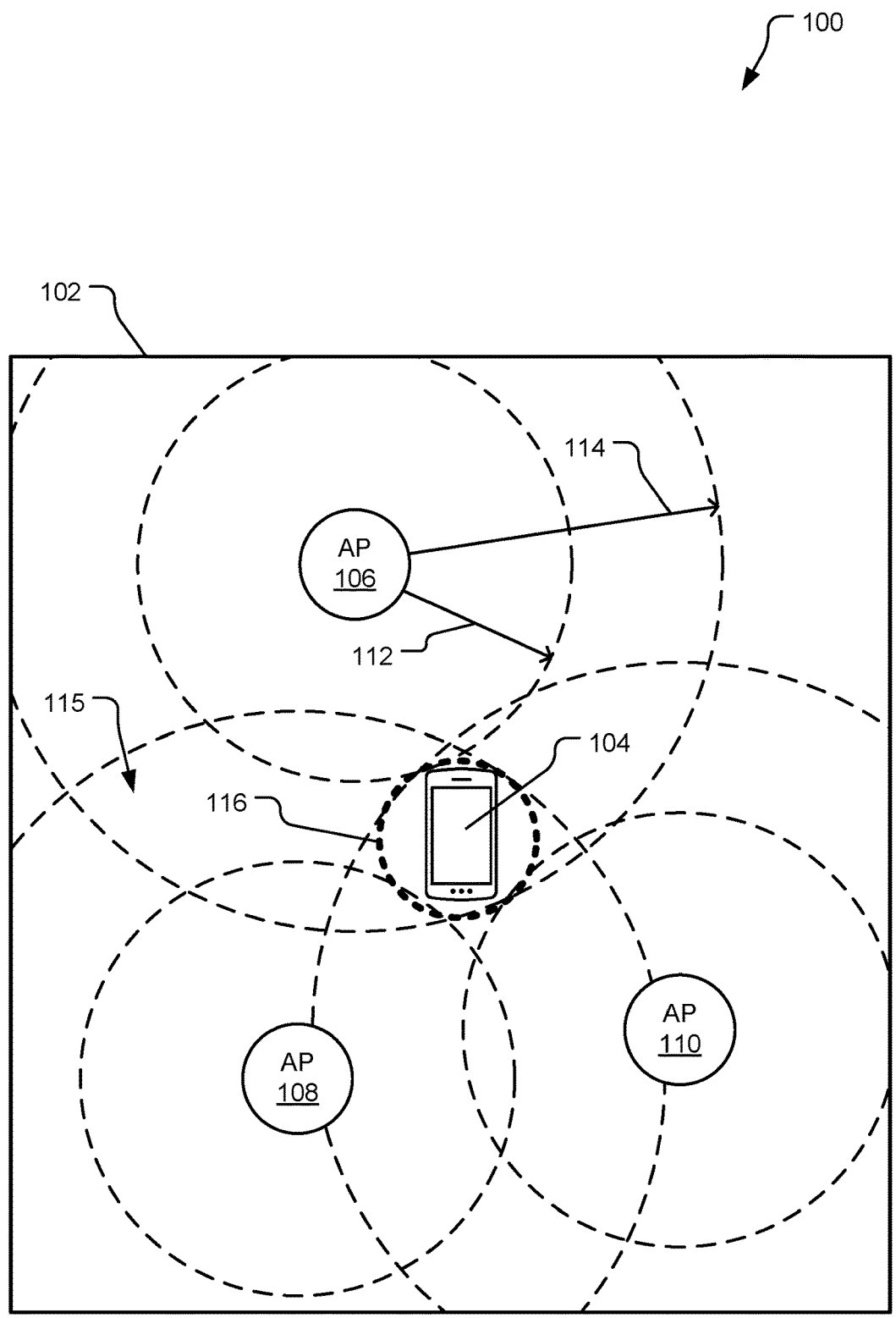
FIG. 1 illustrates indoor geofencing using an example Wi-Fi assisted indoor location service.

As discussed, GNSS location services within a building are useless or nearly useless. Furthermore, indoor location services that heavily utilize the primary processors and the operating system of a mobile device consume an unacceptable amount of processor power and electrical charge over time. Accordingly, the described technology employs a lower power wireless communication chipset (e.g., a Wi-Fi chipset, a Bluetooth chipset, and other sensors to handle substantial portions of common location services, escalating processing to the microprocessor component(s) and operating system of the mobile device to handle a mere subset of the location service processing. In this manner, the lower power chipsets can detect location transitions (e.g., across different geofences, between indoor locations and outdoor locations) and other location services before executing the higher power operations in the operating system of the mobile device. The described technology, therefore, provides effective indoor location services while limiting power consumption (e.g., conserving available battery charge). Moreover, the described technology can also be useful in outdoor locations.

In addition, Wi-Fi assisted indoor location services are examples of power-conserving off-loading location services using a wireless communication device. Other wireless communication technologies may be employed, including Bluetooth technologies.

In one implementation, the described technology utilizes wireless communication signal Round Trip Time (RTT) or ranging measurements, such as those introduced by the IEEE 802.11mc Fine Timing Measurement (FTM) protocol standard to assist in indoor asset tracking and/or geofencing (collectively included in "location services") using low power operation. FTM technology is an example Wi-Fi distance measurement protocol that allows computing devices to measure the distances to nearby Wi-Fi access points (APs) or other wireless communication devices (e.g., peer electronic communication devices, such as mobile phones) using round-trip delay times, although similar technology may be employed in other wireless communication technologies, including Bluetooth. Distances can also be measured between different wireless communication devices, different Bluetooth-enabled devices, etc. Other sensors and wireless communication distance measuring protocols may also be used to assist with such location services, including without limitation GNSS sensors and movement detection sensors (e.g., accelerometers, gyroscopes, pedometers).

A communication device that supports FTM can find the closest set of FTM-capable APs by performing a full or partial Wi-Fi scan or by consulting a pre-populated database of identified APs with their corresponding reference geolocations. The reference geolocation can be set up on an AP during setup or configuration of the AP. The operating system or applications executing on the communication device can use the reference geolocations for APs to determine threshold distances and associated geofences, APs, and/or geolocations of interest. The reference geolocation or each AP (or each other wireless communication device) is predetermined in that the AP and/or the communication device employing the location service can determine the current location of the AP (or each other wireless communication device) through a query to the AP, an access to an AP location database, and other methods.

FIG. 1 illustrates indoor geofencing using an example Wi-Fi assisted indoor location service. It should be understood that the described technology may also be used in outdoor locations. A view 100 includes boundaries of a building 102 in which a communication device 104 is positioned. In addition, there are three Wi-Fi access points (APs) within the building 102—AP 106, AP 108, and AP 110. In FIG. 1, a Wi-Fi chipset of the communication device 104 and the APs support the IEEE 802.11mc Fine Timing Measurement (FTM) protocol standard to assist in indoor asset tracking and/or geofencing (collectively "location services") using low power operation. Other sensors and distance detecting protocols may also be used to assist with such location services, including without limitation GNSS sensors and movement detection sensors (e.g., accelerometers, gyroscopes, pedometers). As such, the Wi-Fi chipset in the communication device 104 can monitor the distance the communication device 104 is from each AP using the FTM protocol.

In the illustrated implementations, geofence regions associated with each AP can be defined by setting a minimum threshold distance and a maximum threshold distance for each AP (see a minimum threshold distance 112 and a maximum threshold distance 114 for the AP 106). As shown with each AP in FIG. 1, each AP individually defines an annular geofence. In another implementation, a single threshold distance from an AP can define a circular geofence about that AP.

By combining the geofences of multiple APs, more precise and/or differently shaped geofences can be defined. For example, the region(s) where the geofences of two APs overlap define one or more geofences regions (see, generally, the region 115 shaped like a double-headed arrow where the individual geofences of AP 106 and AP 108 overlap). If the geofence of AP 110 is added, then a combined geofence of three APs is defined by the overlapping of the three geofences, roughly as a circular geofence 116.

The operating system can instruct the Wi-Fi chipset (e.g., through device driver software) to alert it when the distances between the communication device 104 and certain identified APs newly satisfies or no longer satisfies a virtual boundary condition. In various implementations, for example, the Wi-Fi chipset can signal the one or more primary processors of the communication device 104, which alerts the operating system to the detected event. Other methods of alerting the operating system may be employed.

By monitoring the distances between the communication device 104 and each AP, the Wi-Fi chipset can detect whether and/or when the communication device 104 crosses either or both of the minimum threshold distance and a maximum threshold distance for each AP. In this manner, the communication device 104 can determine whether and/or when it enters or exits the geofence 116 defined by a virtual boundary condition. When a geofence exit or entry is detected, the Wi-Fi chipset can also alert the operating system and other applications, which are executed by one or more primary microprocessor components in the communication device 104.

The Wi-Fi chipset is capable of operating at a lower power consumption level as compared to that of the primary processors of the communication device 104. Accordingly, in one implementation, the operating system and/or applications executing on the primary processors of the communication device 104 communicates one or more virtual boundary conditions to the Wi-Fi chipset and then transitions the primary processors to a lower power state (e.g., to a lower power consumption level, such as a sleep mode or other lower power mode). For example, a virtual boundary condition may identify the three APs (e.g., by MAC address) and the minimum and maximum threshold distances for each AP, thereby defining the geofence 116.

The virtual boundary condition may also specify a direction of movement relative to the geofence 116 (e.g., entering or exiting the geofence 116). To enter a geofence, the distance between the communication device 104 and an AP would decrease below a maximum threshold distance or increase above a minimum threshold distance. To exit a geofence, the distance between the communication device 104 and an AP would increase above a maximum threshold distance or decrease below a minimum threshold distance.

For example, in the illustrated implementation, a virtual boundary condition defines the geofence 116 with respect to the three APs 106, 108, and 110, and consider the situation when the communication device 104 is not within the geofence 116 (i.e., any one distance between the communication device 104 and one of the APs does not fall within the minimum and maximum threshold distances associated with that AP). If the communication device 104 is not within the geofence 116, an entry event occurs when the one or more of the distances between the communication device 104 and each AP change to all fall within the minimum and maximum threshold distances associated with each AP, respectively. In contrast, the communication device 104 is within the geofence 116, an exit event occurs when any one distance between the communication device 104 and one of the APs changes to no longer fall within the minimum and maximum threshold distances associated with that AP.

A virtual boundary condition may also specify a confidence condition—if the distance condition, exit/entry/approach condition, and/or location condition are satisfied in such a way as to satisfy the confidence condition, then the alert is triggered. Otherwise, it may be delayed or withheld. For example, if the distance condition, exit/entry/approach condition, and/or location condition are satisfied for a threshold period of time, a threshold number of monitoring periods, or in accordance with some other confidence condition (e.g., possibly even involving other sensors, such as a movement sensor), then the Wi-Fi chipset can issue the alert to the operating system.

While the one or more primary microprocessor components are in a lower power state, the Wi-Fi chipset monitors the distances from the three APs. If the Wi-Fi chipset detects satisfaction of the virtual boundary condition, then the Wi-Fi chipset can alert the operating system, thereby transitioning the one or more primary microprocessor components to a higher power mode to respond to the change in location of the communication device 104 relative to the geofence 116.

Figure 2:
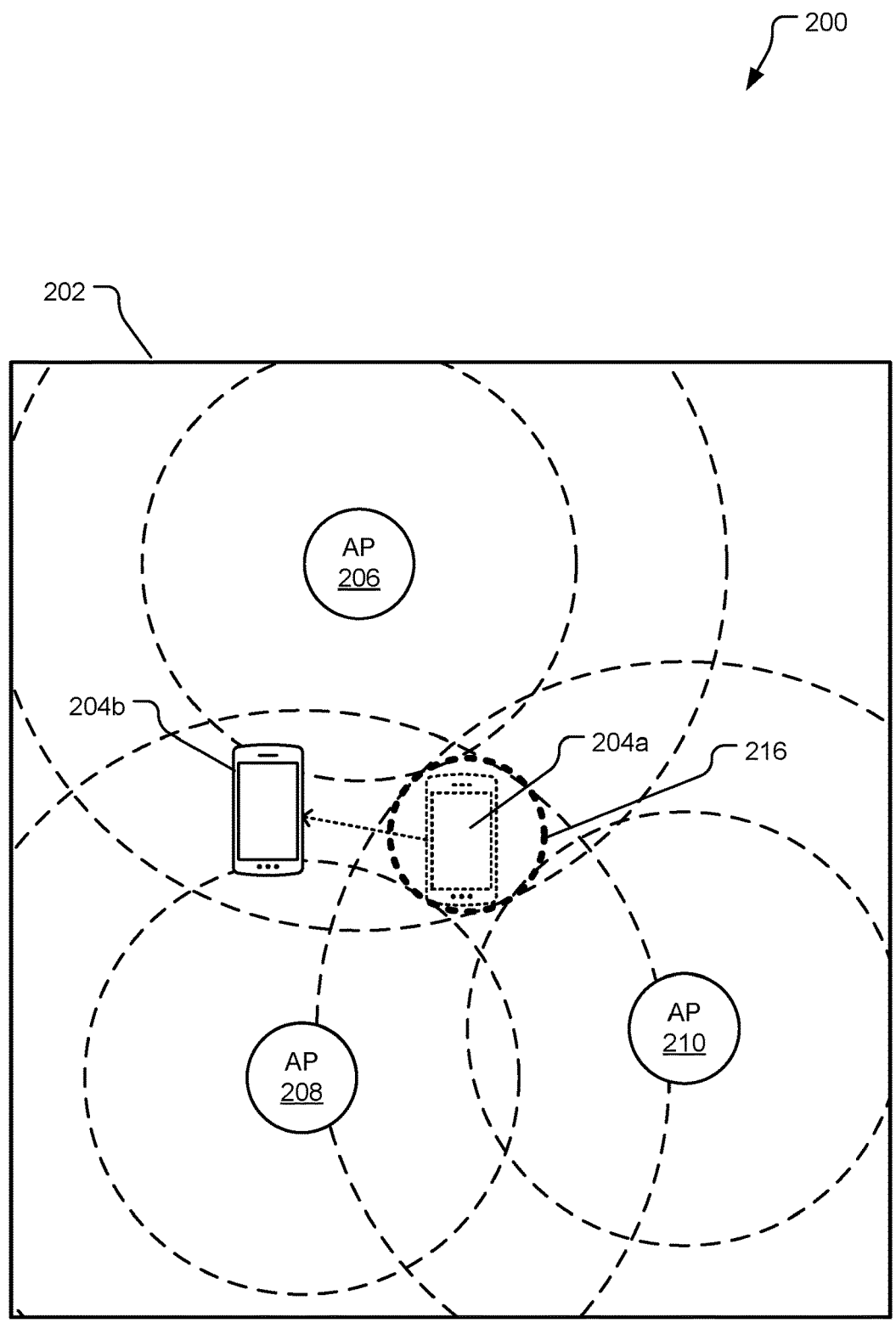
FIG. 2 illustrates detection of a geofence exit using an example Wi-Fi assisted indoor location service.

FIG. 2 illustrates detection of a geofence exit using an example Wi-Fi assisted indoor location service. It should be understood that the described technology may also be used in outdoor locations. A view 200 includes boundaries of a building 202 in which a communication device 204 (shown in two different locations as communication device 204a and communication device 204b) is positioned. In addition, there are three Wi-Fi access points (APs) within the building 202—AP 206, AP 208, and AP 210. In FIG. 2, a Wi-Fi chipset of the communication device 204 and the APs support the IEEE 802.11mc Fine Timing Measurement (FTM) protocol standard to assist in indoor asset tracking and/or geofencing (collectively "location services") using low power operation. Other sensors and distance detecting protocols may also be used to assist with such location services, including without limitation GNSS sensors and movement detection sensors (e.g., accelerometers, gyroscopes, pedometers). As such, the Wi-Fi chipset in the communication device 204 can measure the distance the communication device 204 is from each AP using the FTM protocol.

The operating system can instruct the Wi-Fi chipset (e.g., through device driver software) to alert it when the distances between the communication device 204 and certain identified APs newly no longer satisfies a virtual boundary condition. The Wi-Fi chipset monitors the distances of the communication device 204 from each of the APs and evaluates these distances against the one or more virtual boundary conditions provided by the operating system. In this case, the Wi-Fi chipset detects that in the transition from communication device 204a to 204b, the distance of the communication device 204b exceeds the maximum threshold distance from the AP 210, indicating that the communication device 204b has exited the geofence 216. Accordingly, the Wi-Fi chipset alerts the operating system of this exit event, which (typically) will wake up the one or more primary microprocessor components to a higher power level. The Wi-Fi chipset may also communicate information pertaining to the exit event, such as the distance between the communication device 204b and the AP 210. Other data may also be passed to the operating system responsive to such an alert.

Figure 3:
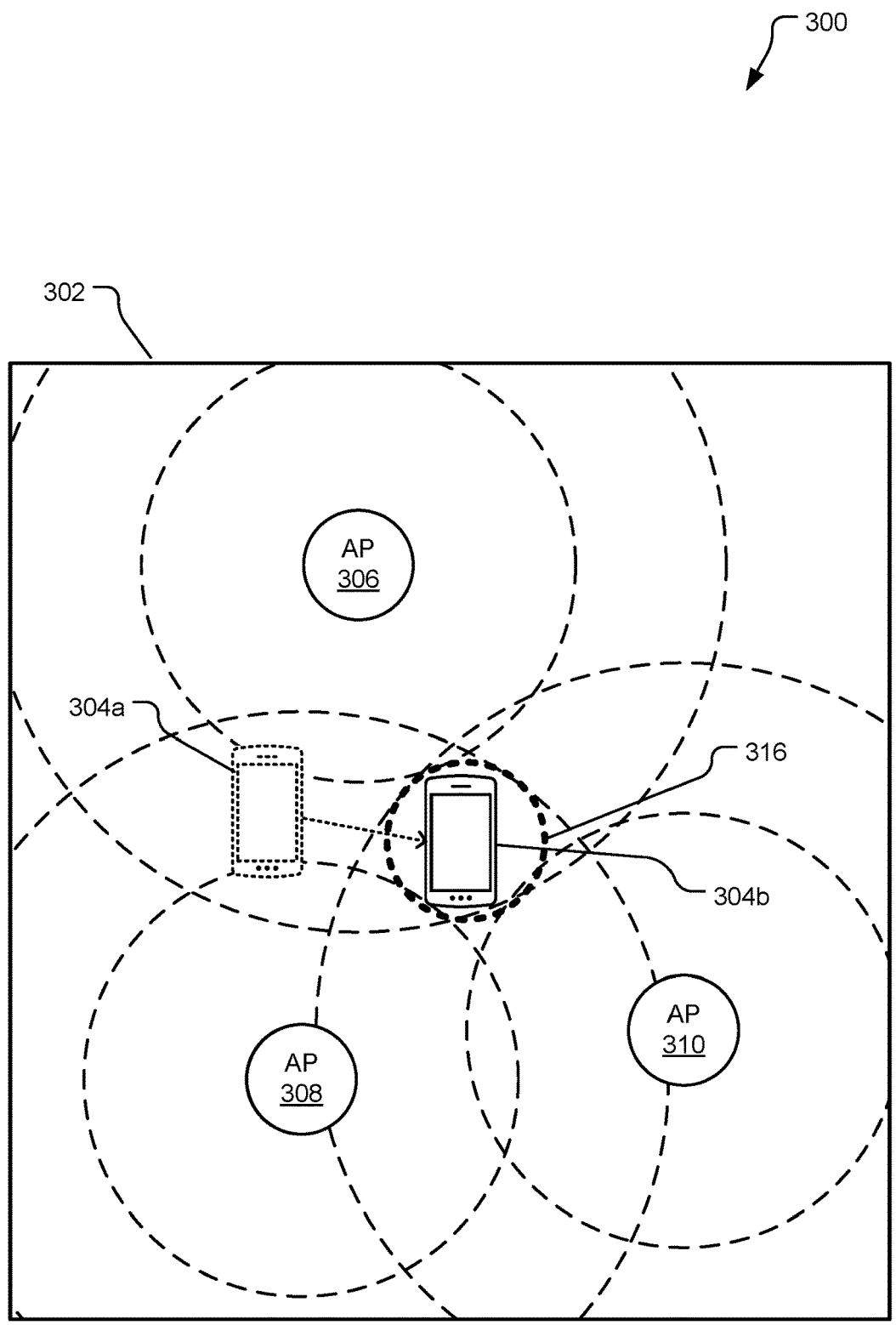
FIG. 3 illustrates detection of a geofence entry using an example Wi-Fi assisted indoor location service.

FIG. 3 illustrates detection of a geofence entry using an example Wi-Fi assisted indoor location service. It should be understood that the described technology may also be used in outdoor locations. A view 300 includes boundaries of a building 302 in which a communication device 304 (shown in two different locations as communication device 304a and communication device 304b) is positioned. In addition, there are three Wi-Fi access points (APs) within the building 302—AP 306, AP 308, and AP 310. In FIG. 3, a Wi-Fi chipset of the communication device 304 and the APs support the IEEE 802.11mc Fine Timing Measurement (FTM) protocol standard to assist in indoor asset tracking and/or geofencing (collectively "location services") using low power operation. Other sensors and distance detecting protocols may also be used to assist with such location services, including without limitation GNSS sensors and movement detection sensors (e.g., accelerometers, gyroscopes, pedometers). As such, the Wi-Fi chipset in the communication device 304 can measure the distance the communication device 304 is from each AP using the FTM protocol.

The operating system can instruct the Wi-Fi chipset (e.g., through device driver software) to alert it when the distances between the communication device 304 and certain identified APs newly satisfy a virtual boundary condition. The Wi-Fi chipset monitors the distances of the communication device 304 from each of the APs and evaluates these distances against one or more virtual boundary conditions provided by the operating system. In this case, the Wi-Fi chipset detects that in the transition from communication device 304a to 304b, the distance of the communication device 304b decreases below the maximum threshold distance from the AP 310 and remains above the minimum threshold distance of the AP 310 and within the minimum and maximum threshold distances of AP 306 and 308, indicating that the communication device 304b has entered the geofence 316. Accordingly, the Wi-Fi chipset alerts the operating system of this entry event, which (typically) will wake up the one or more primary microprocessor components to a higher power level. The Wi-Fi chipset may also communicate information pertaining to the entry event, such as the distances between the communication device 304b and the APs. Other data may also be passed to the operating system responsive to such an alert.

Figure 4:
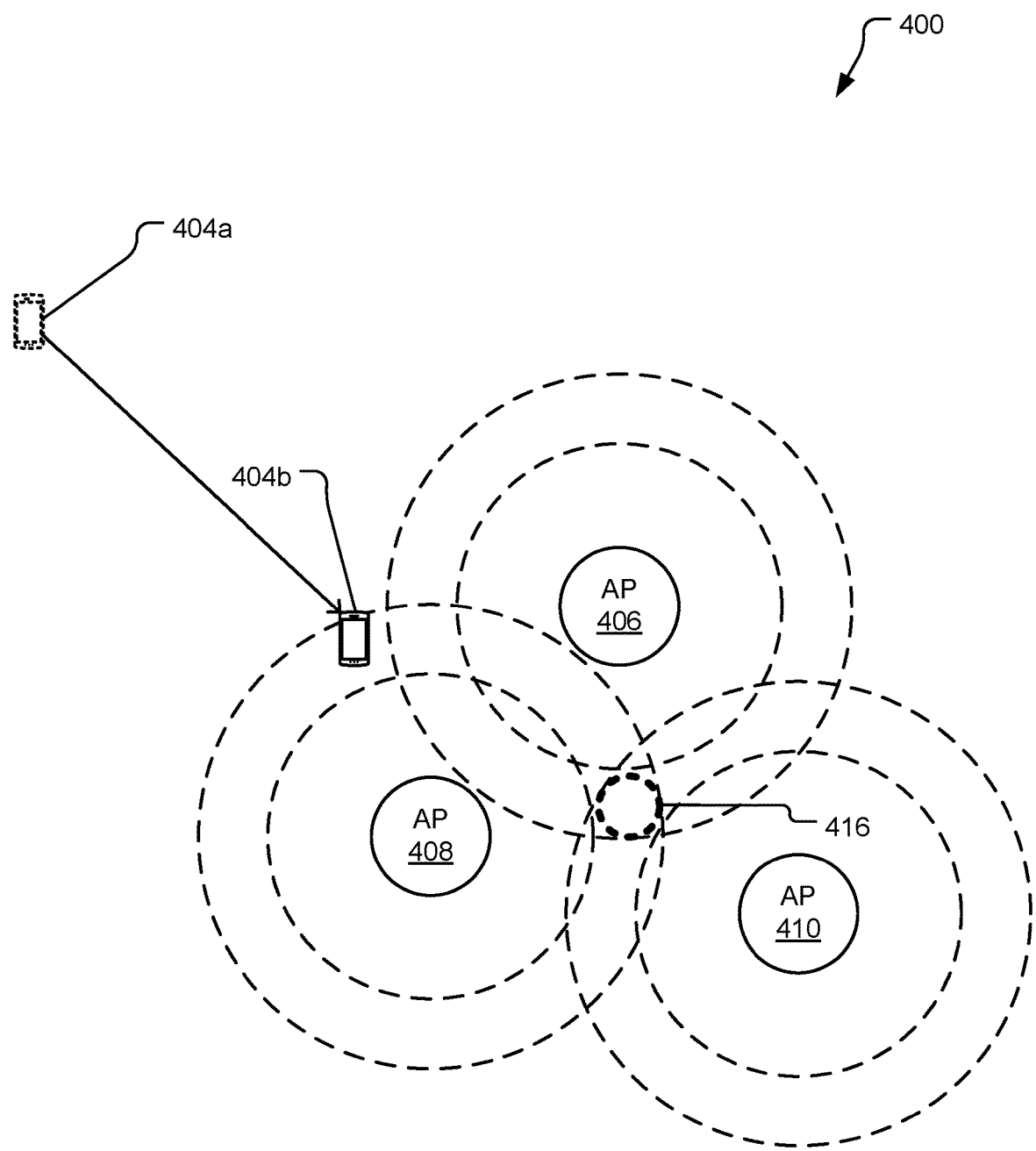
FIG. 4 illustrates detection of a geofence approach event using an example Wi-Fi assisted indoor location service.

FIG. 4 illustrates detection of a geofence approach event using an example Wi-Fi assisted indoor location service. It should be understood that the described technology may also be used in outdoor locations. A "geofence approach" event represents an event in which a geofence is defined by a number of APs, and the communication device does receive a signal from a proper subset of the specified APs, but not all of them. For example, the AP signal may be too weak, subject to interference, or simply off because the AP is not operating correctly. If an AP signal is sufficiently received by the communication device, the AP is called "visible." If an AP signal is not sufficiently received by the communication device, the AP is called "not visible." As such, the communication device can detect whether it satisfies the threshold distances for the visible APs but not those of the not visible AP(s). In this case, it is possible that the communication device has entered the defined geofence, but it cannot be sure because it cannot determine the distance from a non-visible AP. If the operating system is interested in being alerted when this situation is detected, it can instruct the Wi-Fi chipset to monitor distances according to a virtual boundary condition associated with a number of APs but to alert the operating system when the communication device 404 newly satisfies the threshold distances of even a proper subset of the APs.

Turning to FIG. 4, a view 400 includes a communication device 404 (shown in two different locations as communication device 404a and communication device 404b. In addition, there are three Wi-Fi access points (APs) within the view 400—AP 406, AP 408, and AP 410. In FIG. 4, a Wi-Fi chipset of the communication device 404 and the APs support the IEEE 802.11mc Fine Timing Measurement (FTM) protocol standard to assist in indoor asset tracking and/or geofencing (collectively "location services") using low power operation. Other sensors and distance detecting protocols may also be used to assist with such location services, including without limitation GNSS sensors and movement detection sensors (e.g., accelerometers, gyroscopes, pedometers). As such, the Wi-Fi chipset in the communication device 404 can measure the distance the communication device 404 is from each AP using the FTM protocol.

The operating system instructs the Wi-Fi chipset (e.g., through device driver software) to alert it when the Wi-Fi chipset detects a "geofence approach" event for a virtual boundary condition pertaining to a set of APs including the AP 406, the AP 408, and the AP 410. In contrast to an entry event, which occurs when the distances between the communication device 404 and the specified APs satisfy all of the specified threshold distances of all of the specified APs for the virtual boundary condition, a geofence approach event occurs when the distances for at least a subset of the identified APs newly satisfy a virtual boundary condition. In FIG. 4, when the communication device moves from 404a to 404b, only the distance between the communication device 404b and the specified AP 408 satisfies the specified threshold distances of the specified APs from the virtual boundary condition. While not satisfying an entry event for the virtual boundary condition, this transition satisfies a geofence approach event for the virtual boundary condition. Accordingly, if the operating system instructed to the Wi-Fi chipset to alert it if a geofence approach event is detected, the Wi-Fi chipset of the communication device 404b would alert the operating system of the geofence approach event associated with the virtual boundary condition.

Figure 5:
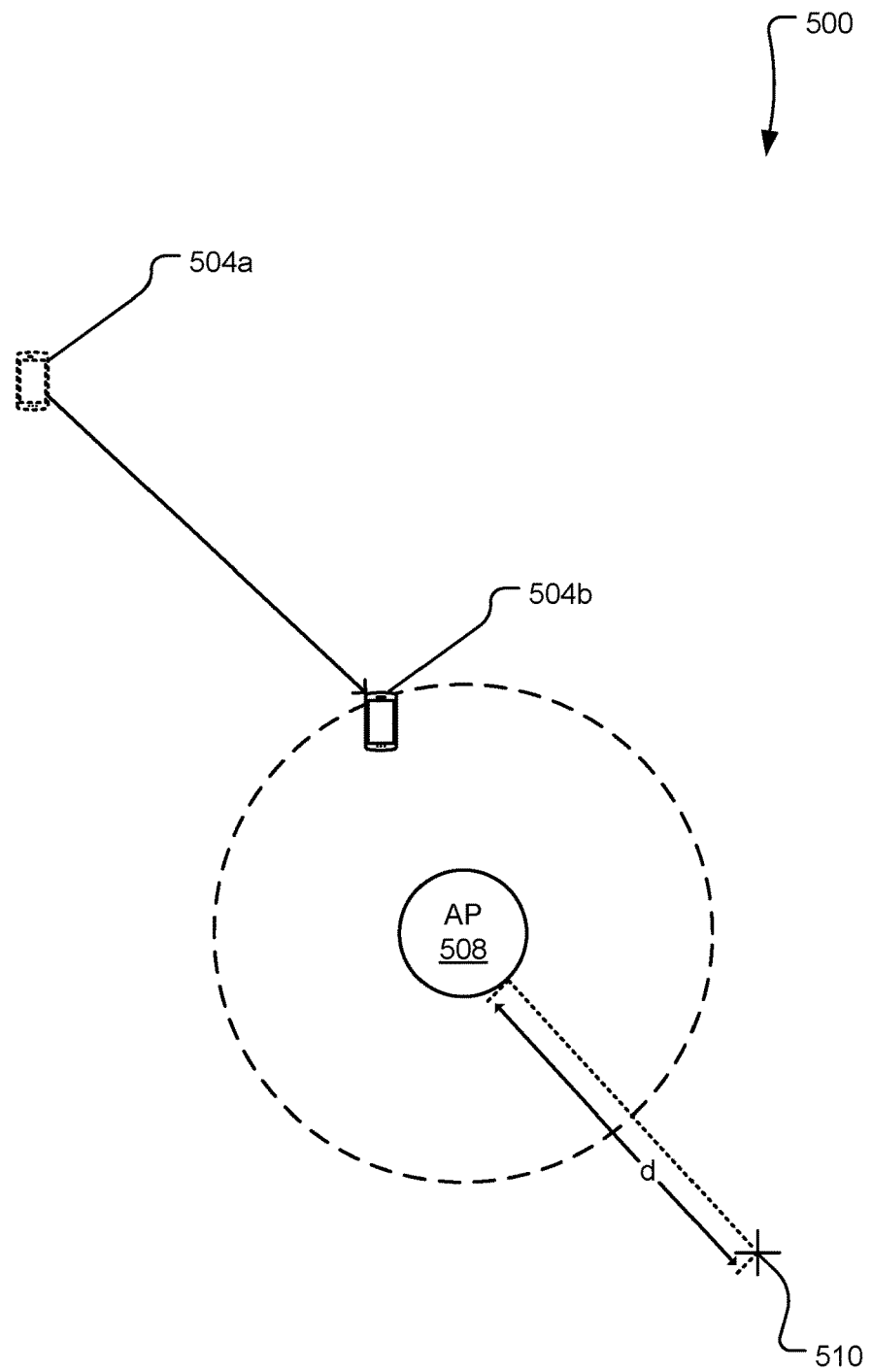
FIG. 5 illustrates detection of a geolocation approach event using an example Wi-Fi assisted indoor location service.

FIG. 5 illustrates detection of a geolocation approach event using an example Wi-Fi assisted indoor location service. It should be understood that the described technology may also be used in outdoor locations. A "geolocation approach" event represents an event in which the operating system specified a predefined threshold distance d and a geolocation of interest and instructs the Wi-Fi chipset to alert the operating system when any AP within the predefined threshold distance d from the specified geolocation becomes visible. The geolocation approach event is helpful when none of the APs the operating system "knows" about are visible (e.g., the operating system knows some of the APs in the proximity they are not yet visible to the Wi-Fi chipset, the operating system is unaware of any APs in the proximity), and so the operating system wants to be alerted when the communication device is near (i.e., within predefined threshold distance d from) a specified geolocation. For example, in response to such an alert, the operating system can begin querying nearby APs in an effort to determine the identities and locations of nearby APs, which were potentially previously unknown or unspecified.

As such, the Wi-Fi chipset can detect an AP, determine the APs location, and determine whether the AP is within the predefined threshold distance d from the specified geolocation. If so, the Wi-Fi chipset alerts the operation to the occurrence of a "geolocation approach" event associated with the virtual boundary location specified by the operating system.

Turning to FIG. 5, a view 500 includes a communication device 504 (shown in two different locations as communication device 504a and communication device 504b). In addition, there is one Wi-Fi access point (AP) within the view 500—AP 508. In FIG. 5, a Wi-Fi chipset of the communication device 504 and the AP 508 support the IEEE 802.11mc Fine Timing Measurement (FTM) protocol standard to assist in indoor asset tracking and/or geofencing (collectively "location services") using low power operation. Other sensors and distance detecting protocols may also be used to assist with such location services, including without limitation GNSS sensors and movement detection sensors (e.g., accelerometers, gyroscopes, pedometers). As such, a Wi-Fi chipset in the communication device 504 can measure the distance the communication device 504 is from the AP 508 using the FTM protocol.

The operating system instructs the Wi-Fi chipset (e.g., through device driver software) to alert it when the Wi-Fi chipset detects a "geolocation approach" event for a virtual boundary condition pertaining to a specified geolocation (e.g., longitude and latitude). A geofence approach event occurs when the communication device moves close enough to any AP to make that AP visible to the communication device, and that AP is within the predefined threshold distance d from the specified geolocation (collectively specified by the virtual boundary condition). In FIG. 5, when the communication device moves from 504a to 504b, the Wi-Fi chipset determines that it has entered the visibility distance 512 of the AP 508, which is within the predefined threshold distance d from the geolocation 510. This transition satisfies a geolocation approach event for the virtual boundary condition. Accordingly, if the operating system instructed to the Wi-Fi chipset to alert it if a geolocation approach event is detected for the specified geolocation and distance d, the Wi-Fi chipset of the communication device 504b would alert the operating system of the geolocation approach event associated with the virtual boundary condition. Alternatively, the geofence approach event could be dependent upon the communication device entering a maximum threshold distance to such an AP, rather than the visibility distance 512.

Figure 6:
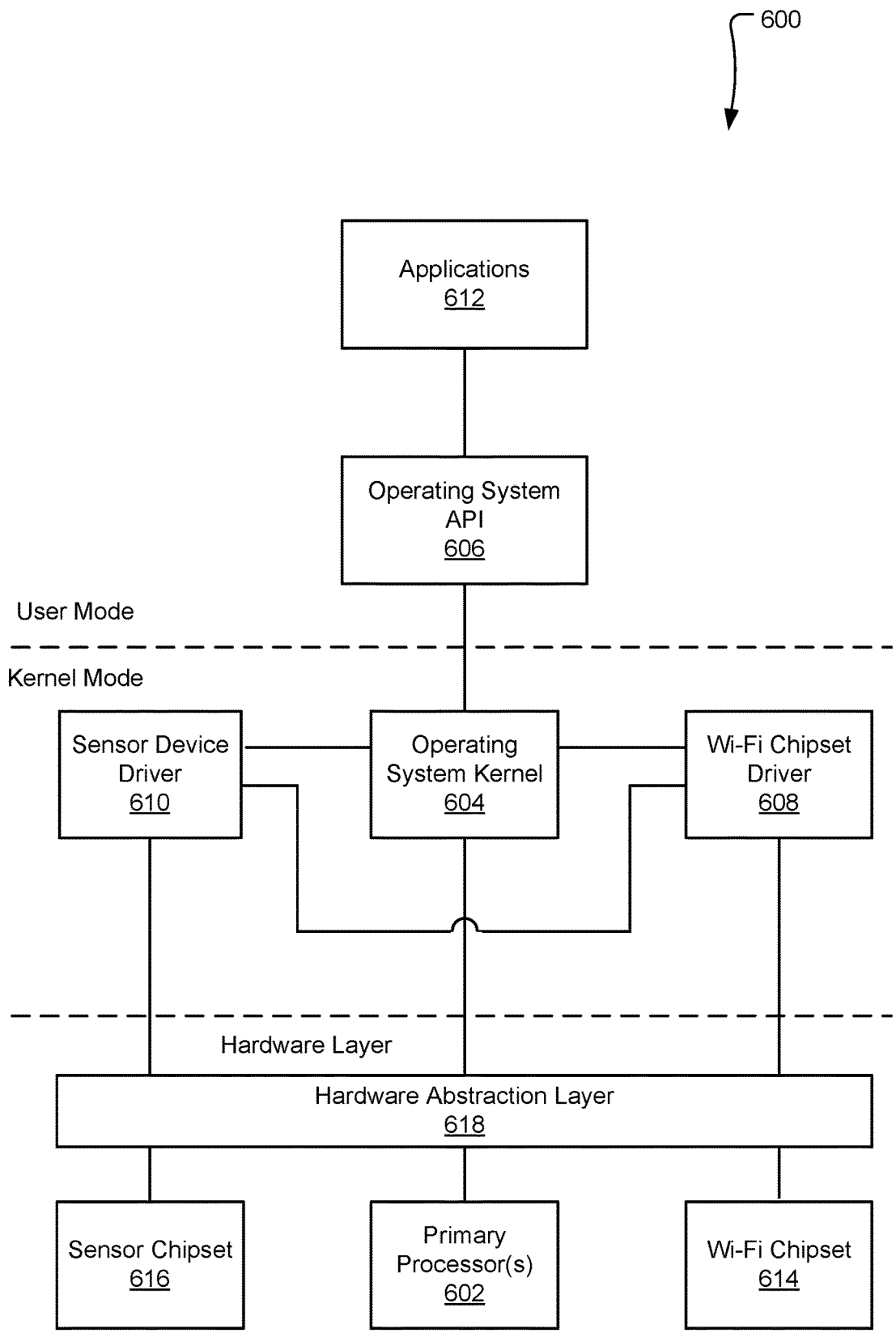
FIG. 6 illustrates an example system for providing an example Wi-Fi assisted indoor location service.

FIG. 6 illustrates an example system 600 for providing an example Wi-Fi assisted indoor location service. It should be understood that the described technology may also be used in outdoor locations. The system 600 represents an example communication device, such as a mobile phone, tablet computer, laptop computer, Internet-of-Things (IoT) device, etc. The system 600 includes one or more primary processors 602, such as a single-core or multi-core microprocessor. The one or more primary processors 602 execute an operating system (split into the operating system kernel 604 and the operating system application programming interface (API) 606, one or more device drivers (see, e.g., Wi-Fi chipset driver 608 and sensor device driver 610) and may execute one or more applications 612. The operating system kernel 604, the Wi-Fi chipset driver 608, and the sensor device driver 610 interface with the one or more primary processors 602, a Wi-Fi chipset 614, and a sensor chipset 616, respectively, via a hardware abstraction layer 618.

In FIG. 6, the Wi-Fi chipset 614 of the communication device supports the IEEE 802.11mc Fine Timing Measurement (FTM) protocol standard to assist in indoor asset tracking and/or geofencing (collectively "location services") using low power operation. Other sensors and distance detecting protocols may also be used to assist with such location services, including without limitation GNSS sensors and movement detection sensors (e.g., accelerometers, gyroscopes, pedometers). As such, the Wi-Fi chipset 614 in the communication device can measure the distance the communication device is from a specified AP using the FTM protocol.

The one or more primary processors 602, and possibly the Wi-Fi chipset 614 and the sensor chipset 616, can transition between two or more power consumption levels. For example, to conserve power (e.g., grid power or battery charge), a hardware component can transition from a high power mode to a lower power mode. In the described technology, the operating system and/or an application can instruct the one or more primary processors 602 to transition to a lower power mode, pending a wake-up event that triggers the one or more primary processors 602 to transition back to a higher power mode. In one implementation, the operating system passes a virtual boundary condition to the Wi-Fi chipset 614 and transitions the one or more primary processors 602 to a lower power mode. When the Wi-Fi chipset 614 detects satisfaction of a virtual boundary condition by the communication device (e.g., with respect to nearby visible access points), the Wi-Fi chipset 614 alerts the operating system, which can then trigger the one or more primary processors 602 to transition back to a higher power mode to process the alert. In some implementations, the Wi-Fi chipset alerts the primary processor to transition back to a higher power mode, which in turn wakes up the operating system.

In one implementation, sensed information from the sensor chipset 616 can use as part of the virtual boundary condition. For example, the sensor chipset 616 may include one or more accelerators, one or more gyroscopes, and/or one or more pedometers to detect motion. If no motion is detected, then a perceived entry, exit, geofence approach, or geolocation approach event may be ignored because the communication device was not moving. In another implementation, absent detection of motion, the Wi-Fi chipset 614 can save power by not taking distance measurements until motion is detected.

In another example, the sensor chipset 616 may include a GNSS receiver module capable of monitoring the position of the communication device at outdoor locations. For example, the operating system can specify a GNSS condition to the GNSS receiver module, which can determine that the communication device has transitioned between an outdoor location and an indoor location and either assist the Wi-Fi chipset 614 in determining whether a virtual boundary condition has been met or notify the operating system itself. Moreover, if the GNSS receiver module is capable of determining the location of the communication device and providing sufficient information for location services, the operating system may designate the GNSS information to supersede any alerting from the Wi-Fi chipset 614, although in other implementations, the FTM solution of the Wi-Fi chipset 614 may be preferred. Communications between the Wi-Fi chipset 614 and the sensor chipset 616 may be through the hardware abstraction layer 618, through the device drivers, through the operating system kernel, through operating system services, and/or through one or more applications.

In both examples, it is expected that using the Wi-Fi chipset consumes more power than taking measurements from movement sensors, although this may not be true in all configurations. In some implementations, the higher layers (e.g., operating system services, applications) may not necessarily be facilitating communication between the Wi-Fi chipset and the sensors but may instead be making decisions on when to enable and disable the geofences in the Wi-Fi chipset 614 based on information from the sensor chipset 616.

Figure 7:
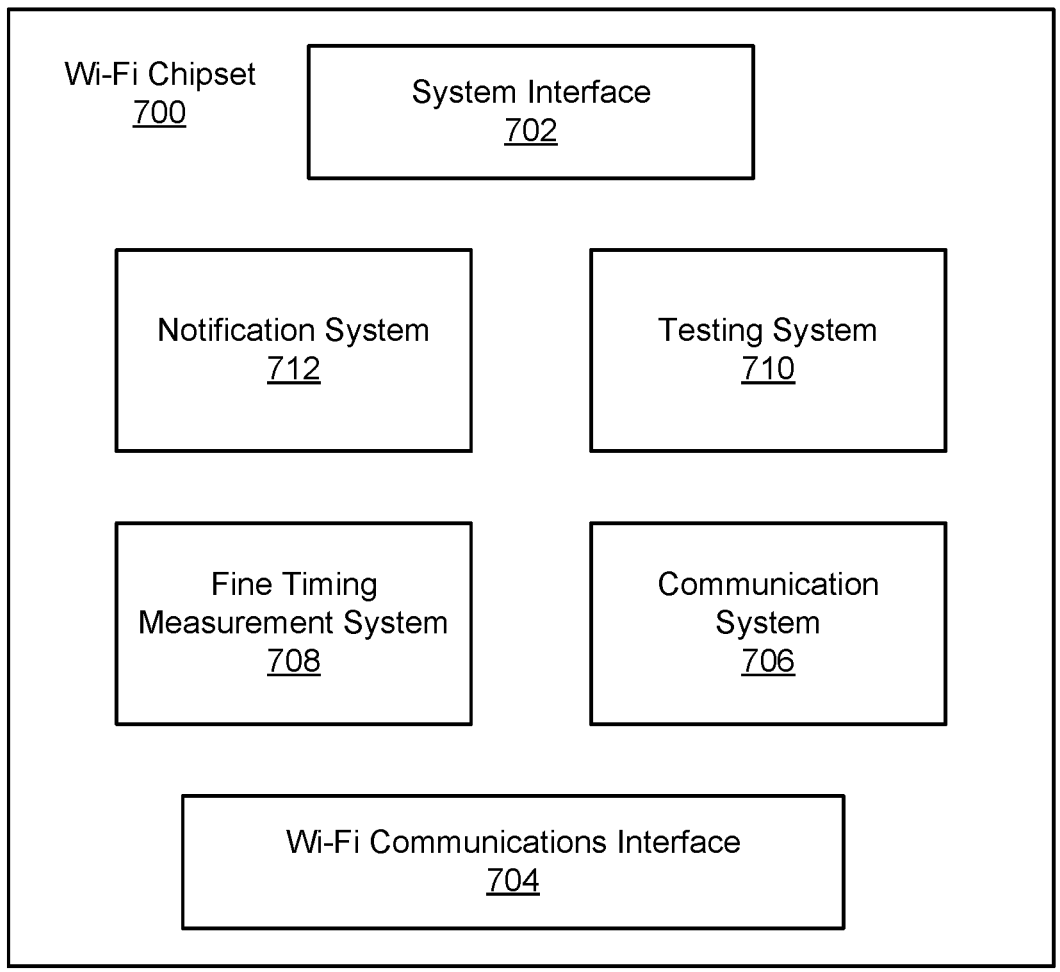
FIG. 7 illustrates an example Wi-Fi chipset for an example Wi-Fi assisted indoor location service.

FIG. 7 illustrates an example Wi-Fi chipset 700 for an example Wi-Fi assisted indoor location service. It should be understood that the described technology may also be used in outdoor locations. The Wi-Fi chipset 700 communicates with the rest of the system (e.g., a communication device) via a system interface 702, which can interface with the hardware abstraction layer, for example. The Wi-Fi chipset 700 communicates with one or more APs via a Wi-Fi communications interface 704. In FIG. 7, the Wi-Fi chipset 700 supports the IEEE 802.11mc Fine Timing Measurement (FTM) protocol standard to assist in indoor asset tracking and/or geofencing (collectively "location services") using low power operation. Other sensors and distance detecting protocols may also be used to assist with such location services, including without limitation GNSS sensors and movement detection sensors (e.g., accelerometers, gyroscopes, pedometers). As such, the Wi-Fi chipset 700 can measure the distance a communication device is from a specified AP using the FTM protocol.

The Wi-Fi chipset 700 receives location services instructions (e.g., a virtual boundary condition including one or more distance conditions between the communication device and one or more Wi-Fi access points) from the operating system through the system interface 702. The Wi-Fi chipset 700 communicates with one or more APs via a Wi-Fi communication system 706 and a Fine timing measurement system 708, which implements the FTM protocol to measure distances between the communication device and one or more APs. A testing system 710 of the Wi-Fi chipset 700 tests the measured distances with one or more virtual boundary conditions specified by the operating system. If the testing system 710 determines that a virtual boundary condition is satisfied, a notification system 712 of the communication device alerts the operating system via the system interface 702. The alert may include without limitations one or more distances to one or more identified APs and an indication of an exit, entry, geofence approach, or geolocation approach event. In one or more implementations, a power management system (not shown) is configured to transition the one or more primary processors of the communication device from a low power mode to a higher power mode, and from the higher power mode to the low power mode.

FIG. 8 illustrates example operations 800 of an example Wi-Fi assisted indoor location service. It should be understood that the described technology may also be used in outdoor locations. The method assists location services for a communication device including one or more primary processors executing an operating system. A receiving operation 802 receives from the operating system in a Wi-Fi chipset of the communication device a virtual boundary condition. A measuring operation 804 measures in the Wi-Fi chipset of the communication device one or more distances between the communication device and one or more Wi-Fi access points. A testing operation 806 determines in the Wi-Fi chipset of the communication device that the virtual boundary condition has been satisfied by the one or more measured distances. It should be understood that, in most cases where the virtual boundary condition is not satisfied, the Wi-Fi chipset loops back to taking more distance measurements in measuring operation 804.

An alert operation 808 notifies the operating system responsive to the determination that at least one of the one or more distance conditions has been satisfied by the one or more measured distances.

In at least one implementation, the one or more primary processors transitions to the low power mode from the higher power mode after the operating system has transferred the virtual boundary condition to the Wi-Fi chipset. Subsequently, responsive to the alert operation, the one or more primary processors transition from a low power mode to a higher power mode. It should be understood that in some implementations, transition of the primary processor to the low power mode may not occur immediately after a virtual boundary condition has been transferred to the Wi-Fi chipset but instead may be triggered based on some other event (e.g., the communication device going to sleep due to idle or the user explicitly putting the communication device to sleep by hitting the power button). If the one or more primary processors are in a low power mode before the alert (e.g., notifying) operation 808, then the result of the alert operation 808 may result in the one or more primary processors transitioning to a higher power mode.

Figure 9:
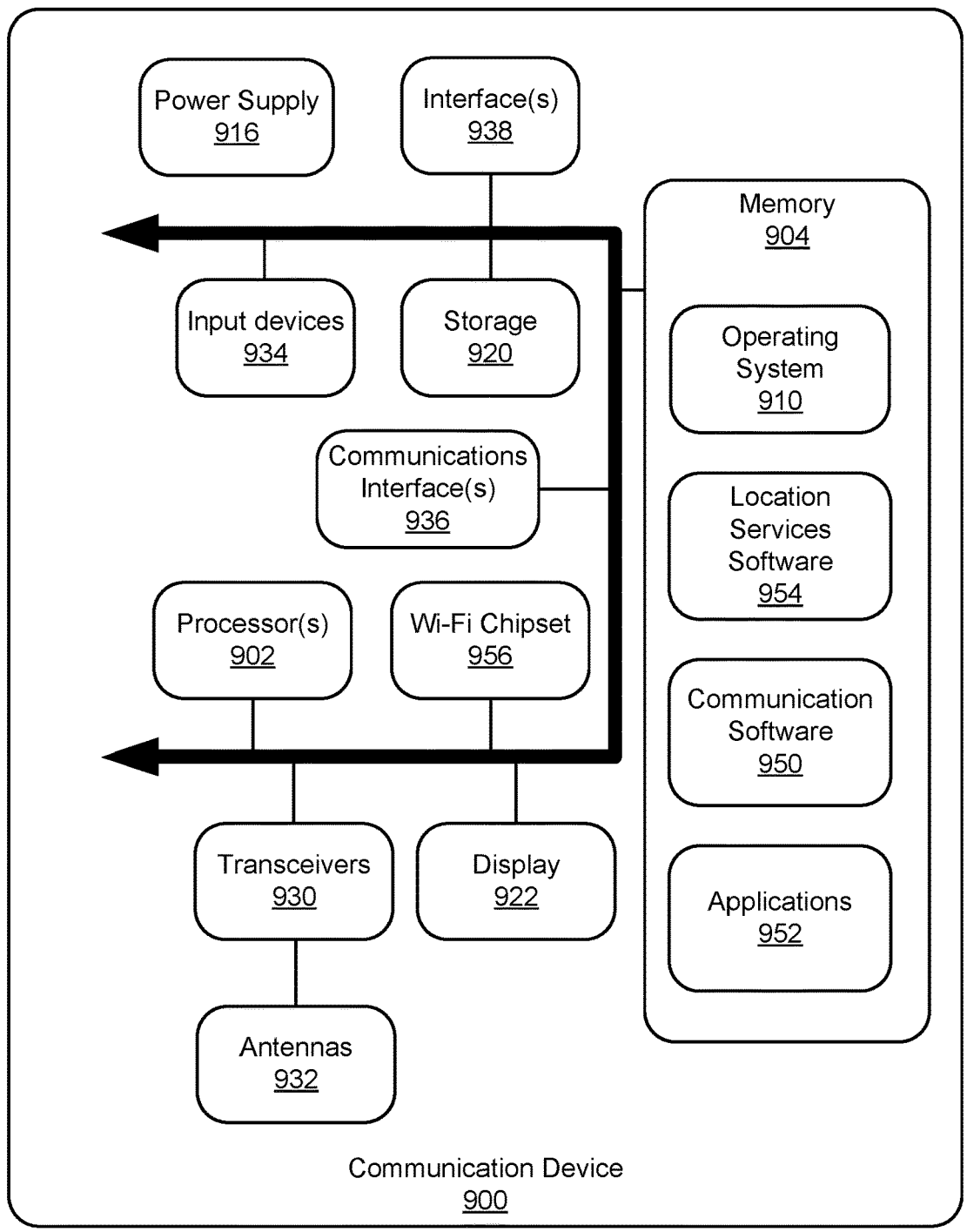
FIG. 9 illustrates an example operating environment and system executing an example Wi-Fi assisted indoor location service.

FIG. 9 illustrates an example operating environment and system executing an example Wi-Fi assisted indoor location service. It should be understood that the described technology may also be used in outdoor locations. The communication device 900 is may be a client device, such as a laptop, mobile device, desktop, tablet; a server/cloud device; an internet-of-things device; an electronic accessory; or another electronic device. The communication device 900 includes one or more processor(s) 902 and a memory 904. The memory 904 generally includes both volatile memory (e.g., RAM) and non-volatile memory (e.g., flash memory). An operating system 910 resides in the memory 904 and is executed by the processor(s) 902.

In an example communication device 900, as shown in FIG. 9, one or more modules or segments, such as communication software 950, application 952, location services software 954, and other modules, are loaded into the operating system 910 on the memory 904 and/or storage 920 and executed by processor(s) 902. The storage 920 may store communication parameters and other data and be local to the communication device 900 or may be remote and communicatively connected to the communication device 900.

The communication device 900 includes a power supply 916, which is powered by one or more batteries or other power sources and which provides power to other components of the communication device 900. The power supply 916 may also be connected to an external power source that overrides or recharges the built-in batteries or other power sources.

The communication device 900 may include one or more communication transceivers 930 which may be connected to one or more antenna(s) 932 to provide network connectivity (e.g., mobile phone network, Wi-Fi®, Bluetooth®) to one or more other servers and/or client devices (e.g., mobile devices, desktop computers, or laptop computers). The communication device 900 includes a Wi-Fi chipset and may further include another communication interface 936. In an implementation of the described technology, the Wi-Fi chipset 956 supports the FTM protocol. The communication device 900 may use the adapter and any other types of communication devices for establishing connections over a wide-area network (WAN) or local-area network (LAN). It should be appreciated that the network connections shown are exemplary and that other communication devices and means for establishing a communications link between the communication device 900 and other devices may be used.

The communication device 900 may include one or more input devices 934 such that a user may enter commands and information (e.g., a keyboard or mouse). These and other input devices may be coupled to the communication device 900 by one or more interfaces 938, such as a serial port interface, parallel port, or universal serial bus (USB). The communication device 900 may further include a display 922, such as a touch screen display.

The communication device 900 may include a variety of tangible processor-readable storage media and intangible processor-readable communication signals. Tangible processor-readable storage can be embodied by any available media that can be accessed by the communication device 900 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the communication device 900. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

While this specification contains many specific implementation details, these should not be construed as limitations on the scope of any inventions or of what may be claimed, but rather as descriptions of features specific to particular embodiments of a particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

An example method of off-loading one or more location services to a wireless communication chipset of a communication device is provided. The communication device includes one or more primary processors configured to execute an operating system. The method includes receiving, in the wireless communication chipset of the communication device, a virtual boundary condition from the operating system. The virtual boundary condition specifies at least one threshold distance between the communication device and one or more wireless communication devices. The one or more primary processors transition to a low power mode from a higher power mode, responsive to the receiving operation. One or more distances between the communication device and the one or more wireless communication devices are measured, in the wireless communication chipset of the communication device, using a wireless communication distance measuring protocol. The wireless communication chipset of the communication device determines that the virtual boundary condition has been satisfied by the one or more measured distances. The operating system is notified that the virtual boundary condition has been satisfied by the one or more measured distances. The one or more primary processors are transitioned from the low power mode to the higher power mode, responsive to the notifying operation.

Another example method of any preceding method is provided, wherein the one or more measured distances are measured using the IEEE 802.11mc Fine Timing Measurement (FTM) protocol standard.

Another example method of any preceding method is provided, wherein the one or more measured distances are measured using a wireless communication signal round-trip-time (RTT) measurement.

Another example method of any preceding method is provided, wherein the virtual boundary condition specifies a geofence defined by one or more threshold distance conditions between the communication device and the one or more wireless communication devices.

Another example method of any preceding method is provided, wherein the one or more threshold distance conditions include a minimum threshold distance and a maximum threshold distance for a specified access point.

Another example method of any preceding method is provided, wherein the virtual boundary condition specifies one or more threshold distance conditions defining a geofence and instructs the wireless communication chipset to notify the operating system when the one or more measured distances indicate that the communication device has entered the geofence.

Another example method of any preceding method is provided, wherein the virtual boundary condition specifies one or more threshold distance conditions defining a geofence and instructs the wireless communication chipset to notify the operating system when the one or more measured distances indicate that the communication device has exited the geofence.

Another example method of any preceding method is provided, wherein another virtual boundary condition is received by the wireless communication chipset from the operating system, the other virtual boundary condition specifying a geolocation and a predefined threshold distance and instructing the wireless communication chipset to notify the operating system after the communication device detects a wireless communication device that is at a location within the specified predefined threshold distance from the specified geolocation.

An example communication device for off-loading one or more location services is provided. The communication device includes one or more primary processors configured to execute an operating system and a wireless communication chipset. The wireless communication chipset includes a system interface configured to receive a virtual boundary condition to off-load the one or more location services from the operating system. The virtual boundary condition specifies at least one threshold distance between the communication device and one or more wireless communication devices, wherein the one or more primary processors transition to a low power mode from a higher power mode, responsive to reception of the virtual boundary condition. The wireless communication device also includes a measurement system configured to measure one or more distances between the communication device and the one or more wireless communication devices using a wireless communication distance measuring protocol. A testing system is configured to determine that the virtual boundary condition has been satisfied by the one or more measured distances. A notification system is configured to notify the operating system through the system interface, responsive to a determination that the virtual boundary condition has been satisfied by the one or more measured distances, wherein the one or more primary processors transition from the low power mode to the higher power mode, responsive to notification.

Another example communication device of any preceding communication device is provided, wherein the one or more measured distances are measured using the IEEE 802.11mc Fine Timing Measurement (FTM) protocol standard.

Another example communication device of any preceding communication device is provided, wherein the one or more measured distances are measured using a wireless communication signal round-trip-time (RTT) measurement.

Another example communication device of any preceding communication device is provided, wherein the virtual boundary condition specifies a geofence defined by one or more threshold distance conditions between the communication device and the one or more wireless communication devices.

Another example communication device of any preceding communication device is provided, wherein satisfaction the virtual boundary condition in the wireless communication chipset of the communication device depends on a global navigation satellite system (GNSS)-based determination that the communication device has transitioned between an outdoor location and an indoor location.

Another example communication device of any preceding communication device is provided, wherein satisfaction the virtual boundary condition in the wireless communication chipset of the communication device depends on a sensor-based determination that the communication device is moving when the virtual boundary condition is satisfied.

One or more example tangible processor-readable storage media devices of a tangible article of manufacture encoding processor-executable instructions for executing in an electronic communication device provide a process of off-loading one or more location services to a wireless communication chipset of the electronic communication device. The electronic communication device includes one or more primary processors configured to execute an operating system. The process includes receiving, in the wireless communication chipset of the electronic communication device, a virtual boundary condition from the operating system. The virtual boundary condition specifies at least one threshold distance between the electronic communication device and one or more wireless communication devices. The one or more primary processors transition to a low power mode from a higher power mode, responsive to the receiving operation. The wireless communication chipset of the electronic communication device measures one or more distances between the electronic communication device and the one or more wireless communication devices using a wireless communication distance measuring protocol. The wireless communication chipset of the electronic communication device determines that the virtual boundary condition has been satisfied by the one or more measured distances. The operating system is notified that the virtual boundary condition has been satisfied by the one or more measured distances. The one or more primary processors transition from the low power mode to the higher power mode, responsive to the notifying operation.

Other one or more example tangible processor-readable storage media devices of any preceding media, wherein the one or more measured distances are measured using the IEEE 802.11mc Fine Timing Measurement (FTM) protocol standard.

Other one or more example tangible processor-readable storage media devices of any preceding media, wherein the one or more measured distances are measured using a wireless communication signal round-trip-time (RTT) measurement.

Other one or more example tangible processor-readable storage media devices of any preceding media, wherein the virtual boundary condition specifies one or more threshold distance conditions defining a geofence and instructs the wireless communication chipset to notify the operating system when the one or more measured distances indicate that the electronic communication device has entered the geofence.

Other one or more example tangible processor-readable storage media devices of any preceding media, wherein the virtual boundary condition specifies one or more threshold distance conditions defining a geofence and instructs the wireless communication chipset to notify the operating system when the one or more measured distances indicate that the electronic communication device has exited the geofence.

Other one or more example tangible processor-readable storage media devices of any preceding media, wherein another virtual boundary condition is received by the wireless communication chipset from the operating system, the other virtual boundary condition specifying a geolocation and a predefined threshold distance and instructing the wireless communication chipset to notify the operating system after the communication device detects a wireless communication device that is at a location within the specified predefined threshold distance from the specified geolocation.

An example system for off-loading one or more location services to a wireless communication chipset of a communication device is provided. The communication device includes one or more primary processors configured to execute an operating system. The system includes means for receiving, in the wireless communication chipset of the communication device, a virtual boundary condition from the operating system. The virtual boundary condition specifies at least one threshold distance between the communication device and one or more wireless communication devices. The system also includes means for transiting the one or more primary processors to a low power mode from a higher power mode, responsive to the receiving. The system also includes means for measuring one or more distances between the communication device and the one or more wireless communication devices, in the wireless communication chipset of the communication device, using a wireless communication distance measuring protocol. The system also includes means for determining that the wireless communication chipset of the communication device that the virtual boundary condition has been satisfied by the one or more measured distances. The system also includes means for notifying the operating system that the virtual boundary condition has been satisfied by the one or more measured distances. The system also includes means for transitioning the one or more primary processors from the low power mode to the higher power mode, responsive to the notifying.

Another example method of any preceding method is provided, wherein the one or more measured distances are measured using the IEEE 802.11mc Fine Timing Measurement (FTM) protocol standard.

Another example method of any preceding method is provided, wherein the one or more measured distances are measured using a wireless communication signal round-trip-time (RTT) measurement.

Another example method of any preceding method is provided, wherein the virtual boundary condition specifies a geofence defined by one or more threshold distance conditions between the communication device and the one or more wireless communication devices.

Another example method of any preceding method is provided, wherein the one or more threshold distance conditions include a minimum threshold distance and a maximum threshold distance for a specified access point.

Another example method of any preceding method is provided, wherein the virtual boundary condition specifies one or more threshold distance conditions defining a geofence and instructs the wireless communication chipset to notify the operating system when the one or more measured distances indicate that the communication device has entered the geofence.

Another example method of any preceding method is provided, wherein the virtual boundary condition specifies one or more threshold distance conditions defining a geofence and instructs the wireless communication chipset to notify the operating system when the one or more measured distances indicate that the communication device has exited the geofence.

Another example method of any preceding method is provided, wherein another virtual boundary condition is received by the wireless communication chipset from the operating system, the other virtual boundary condition specifying a geolocation and a predefined threshold distance and instructing the wireless communication chipset to notify the operating system after the communication device detects a wireless communication device that is at a location within the specified predefined threshold distance from the specified geolocation.

A number of implementations of the described technology have been described. Nevertheless, it will be understood that various modifications can be made without departing from the spirit and scope of the recited claims.

What is claimed is:

1. A method of off-loading a location service from an operating system to a wireless communication chipset of a communication device, the method comprising:
  measuring, in the wireless communication chipset of the communication device, a distance between the communication device and a wireless communication device;
  determining, in the wireless communication chipset of the communication device, that the distance is within a threshold distance; and
  implementing the location service, using the wireless communication chipset of the communication device, based on the determining that the distance is within the threshold distance, wherein implementing the location service using the wireless communication chipset of the communication device consumes less power compared to implementing the location service using the operating system.

2. The method of claim 1, wherein the distance is measured using an IEEE 802.11mc Fine Timing Measurement (FTM) protocol standard.

3. The method of claim 1, wherein the distance is measured using a wireless communication signal round-trip-time (RTT) measurement.

4. The method of claim 1, wherein the threshold distance is associated with a geofence defined by the wireless communication device.

5. The method of claim 4, wherein the wireless communication device comprises an access point and the geofence is defined for the access point.

6. The method of claim 4, wherein:
determining that the distance is within the threshold distance signals that the communication device has entered the geofence; and
the method further comprises notifying the operating system that the distance is within the threshold distance, thereby signaling to the operating system that the communication device has entered the geofence.

7. The method of claim 6, further comprising:
measuring, in the wireless communication chipset of the communication device, another distance between the communication device and the wireless communication device;
determining, in the wireless communication chipset of the communication device, that the other distance is not within the threshold distance; and
notifying the operating system that the other distance is not within the threshold distance, thereby signaling to the operating system that the communication device has exited the geofence.

8. The method of claim 1, wherein a processor is transitioned from a first power mode to a second power mode that consumes less power than the first power while the wireless communication chipset of the communication device is used to implement the location service.

9. A device for off-loading a location service from an operating system to a wireless communication chipset, the device comprising:
a processor configured to execute the operating system; and
the wireless communication chipset configured to:
measure a distance between the device and a wireless communication device;
determine that the distance is within a threshold distance; and
implement the location service based on the determining that the distance is within the threshold distance, wherein implementing the location service using the wireless communication chipset consumes less power compared to implementing the location service using the operating system.

10. The device of claim 9, wherein the distance is measured using an IEEE 802.11mc Fine Timing Measurement (FTM) protocol standard.

11. The device of claim 9, wherein the distance is measured using a wireless communication signal round-trip-time (RTT) measurement.

12. The device of claim 9, wherein the threshold distance is associated with a geofence defined by the wireless communication device.

13. The device of claim 12, wherein the wireless communication device comprises an access point and the geofence is defined for the access point.

14. The device of claim 12, wherein:
determining that the distance is within the threshold distance signals that the device has entered the geofence; and
the wireless communication chipset is further configured to notify the operating system that the distance is within the threshold distance, thereby signaling to the operating system that the device has entered the geofence.

15. The device of claim 14 wherein the wireless communication chipset is further configured to:
measure another distance between the device and the wireless communication device;
determine that the other distance is not within the threshold distance; and
notify the operating system that the other distance is not within the threshold distance, thereby signaling to the operating system that the device has exited the geofence.

16. The device of claim 9, wherein the processor is transitioned from a first power mode to a second power mode that consumes less power than the first power while the wireless communication chipset implements the location service.

17. A wireless communication chipset of a device with an operating system configured to implement a location service, the wireless communication chipset configured to:
measure a distance between the device and a wireless communication device;
determine that the distance is within a threshold distance; and
implement the location service based on the determining that the distance is within the threshold distance, wherein implementing the location service using the wireless communication chipset of the communication device consumes less power compared to implementing the location service using the operating system.

18. The wireless communication chipset of claim 17, wherein:
determining that the distance is within the threshold distance signals that the device has entered a geofence defined by wireless communication device; and
the wireless communication chipset is further configured to notify the operating system that the distance is within the threshold distance, thereby signaling to the operating system that the device has entered the geofence.

19. The wireless communication chipset of claim 18, further configured to:
measure another distance between the device and the wireless communication device;
determine that the other distance is not within the threshold distance; and
notify the operating system that the other distance is not within the threshold distance, thereby signaling to the operating system that the device has exited the geofence.

20. The wireless communication chipset of claim 17, wherein a processor of the device is transitioned from a first power mode to a second power mode that consumes less power than the first power while the wireless communication chipset implements the location service.

* * * * *